United States Patent [19]

Charles

[11] Patent Number: 5,009,459
[45] Date of Patent: Apr. 23, 1991

[54] WIPER SYSTEM FOR RAKED WINDSHIELD

[75] Inventor: Harlan W. Charles, Southfield, Mich.

[73] Assignee: General Motors Corporation, Detroit, Mich.

[21] Appl. No.: 497,172

[22] Filed: Mar. 22, 1990

[51] Int. Cl.$^5$ ................................................ B60S 1/28
[52] U.S. Cl. ................................ 296/84.1; 296/96.15; 15/250.31
[58] Field of Search .............. 296/96.15, 96.17, 84.1; 15/250 B, 250.19, 250.31; 248/446, 475.1

[56] References Cited

U.S. PATENT DOCUMENTS

| | | | |
|---|---|---|---|
| 387,919 | 8/1888 | Richards | 15/250.31 |
| 1,055,918 | 3/1913 | Jones | 15/250.31 |
| 1,077,402 | 11/1913 | Ford | 15/250.19 |
| 2,184,700 | 12/1939 | Horton | 15/255 |
| 2,264,241 | 11/1941 | Horton | 15/255 |
| 2,501,013 | 3/1950 | Peter | 296/95 |
| 2,691,186 | 10/1954 | Oishei et al. | 15/250.31 X |
| 3,120,673 | 2/1964 | Buchwald | 15/250.19 X |
| 3,413,676 | 12/1968 | Engel | 15/250.13 X |
| 3,791,468 | 2/1974 | Bryan, Jr. | 180/1 FV |
| 4,049,309 | 9/1977 | Seal | 296/1 S |
| 4,141,102 | 2/1979 | Lawrence | 15/250.19 X |
| 4,490,013 | 12/1984 | Pribis | 248/466 X |

FOREIGN PATENT DOCUMENTS

| | | | |
|---|---|---|---|
| 2610408 | 9/1977 | Fed. Rep. of Germany | 248/466 |
| 155043 | 7/1986 | Japan | 15/250.B |
| 577588 | 5/1946 | United Kingdom | 15/250.31 |
| 789571 | 1/1958 | United Kingdom | 296/96.15 |

Primary Examiner—Johnny D. Cherry
Assistant Examiner—Joseph D. Pape
Attorney, Agent, or Firm—Patrick M. Griffin

[57] ABSTRACT

To wipe an elongated, raked windshield, two of fixed length wipers are oscillated about pivot points located midway along the side edges of the windshield. Consequently, a larger area wipe pattern is achieved than that which could be achieved by equivalent length wipers mounted in conventional locations. In addition, in the embodiment disclosed, the wiper pivot points are located beneath the housings of a pair of side mirrors. This allows a portion of the wipers to be covered when the wipers are parked, for aesthetic purposes.

1 Claim, 2 Drawing Sheets

WIPER SYSTEM FOR RAKED WINDSHIELD

This invention relates to vehicle windshield wipers in general, and specifically to a wiper system for use with a steeply raked windshield.

BACKGROUND OF THE INVENTION

As vehicle windshields have become more aerodynamic, they have become more difficult to wipe. Coefficients of drag can be lowered by steeply raking the windshield, sweeping it back dramatically so that it slices the air, rather than buffeting it. As a consequence, the windshield becomes relatively much longer, measured from top to bottom, as compared to its side to side width. There is a vertical area in front of the driver's line of sight that must, by regulation, be wiped. This is the so called legal area. Conventional wiper systems have one or more oscillating wipers pivoted at points near the lower windshield edge. With short, conventionally sized windshields, relatively short wipers are sufficient to wipe the legal area. With long, swept back windshields, extremely long wipers must sometimes be used to wipe the same effective vertical area. With even more steeply raked windshields in the future, it might not be possible to make conventionally located wipers long enough to wipe a sufficient area of the windshield.

SUMMARY OF THE INVENTION

The invention provides a wiper system for a very steeply raked windshield in which substantially the entire area of the windshield can be wiped.

In the embodiment disclosed, the raked windshield is lengthy, with an upper, roof line edge far from its lower, cowl line edge. The side edges are consequently quite long. Furthermore, each side edge is not straight, as is conventional, but forms a long, broad V, with an upper branch running along a body door pillar line, and a lower branch running along a hood line. Each of a pair of wiper arms is adapted to be oscillated about a pivot point located near the base of the V, that is, near the juncture of the door pillar line and hood line. Each wiper arm covers a wipe pattern with an upper limit that is parallel to a respective door pillar line, and a lower limit parallel to a respective hood line.

A wiper blade is mounted to each of the arms, and sweeps over the windshield as the arm moves. Since each wiper arm pivot point is near the center of a windshield side edge, each blade can be made long enough to reach nearly to both the upper and lower edges of the windshield. Since nearly the entire surface area of the windshield is wiped, enough effective vertical area is also wiped. In addition, in the particular embodiment disclosed, the vehicle body includes a pair of aerodynamically shaped side mirror housings, located over the wiper pivot points. They extend partially along the hood line edges, and are slotted where they overhang the windshield, so that the wiper arms can move through them. The housings thus act to mask the wiper pivots, and also partially cover the wiper arms when they are parked at the lower limit of the wipe pattern.

It is, therefore, a general object of the invention to wipe a sufficient area of a steeply raked windshield with a pair of fixed length wiper arms.

It is another object of the invention to wipe most of the area of such a windshield by siting a pair of fixed length wiper arms with their pivot points located midway along the side edges of the windshield, rather than along the bottom edge.

It is another object of the invention to provide a pair of slotted side mirror housings near the wiper pivot points, so as to partially mask the wipers.

DESCRIPTION OF THE PREFERRED EMBODIMENT

These and other objects and features of the invention will appear from the following written description, and from the drawings, in which.

Figure 3A:
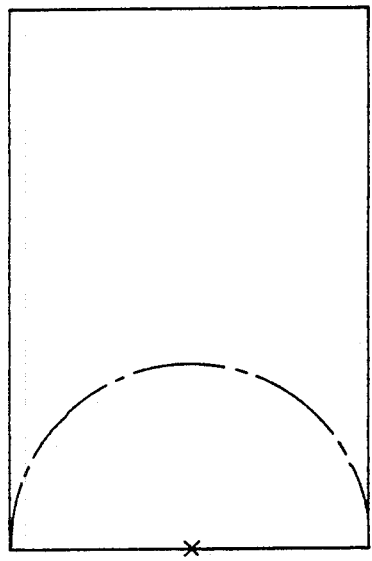
Figure 3B:
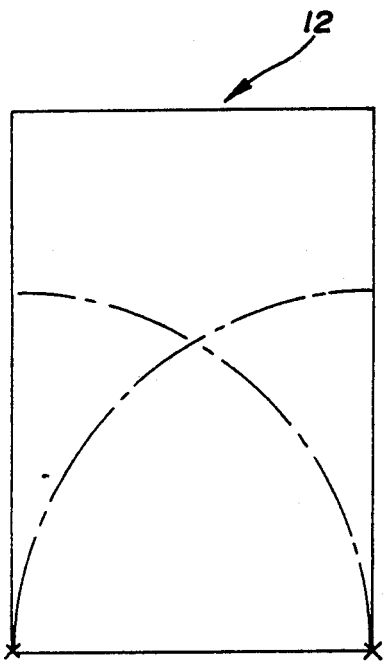
Figure 3C:
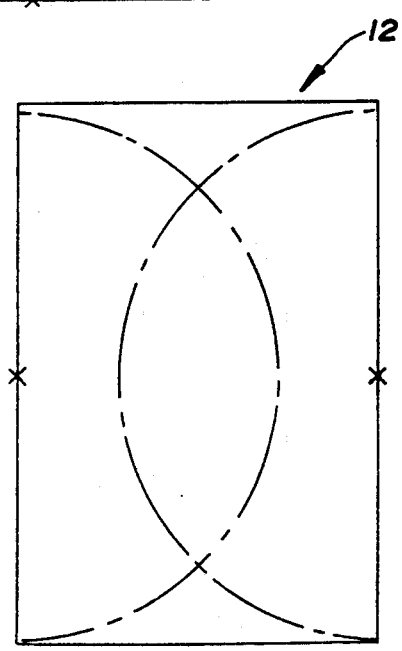

FIG. 3a schematically illustrates the wipe pattern that would result on a windshield of the same general shape if wiped by a single, conventionally located wiper;

FIG. 3b illustrates the wipe pattern that would result on the same windshield if wiped with two conventionally located wipers;

FIG. 3c illustrates the wipe pattern that wipers located as per the invention would produce on the same windshield.

Figure 1:
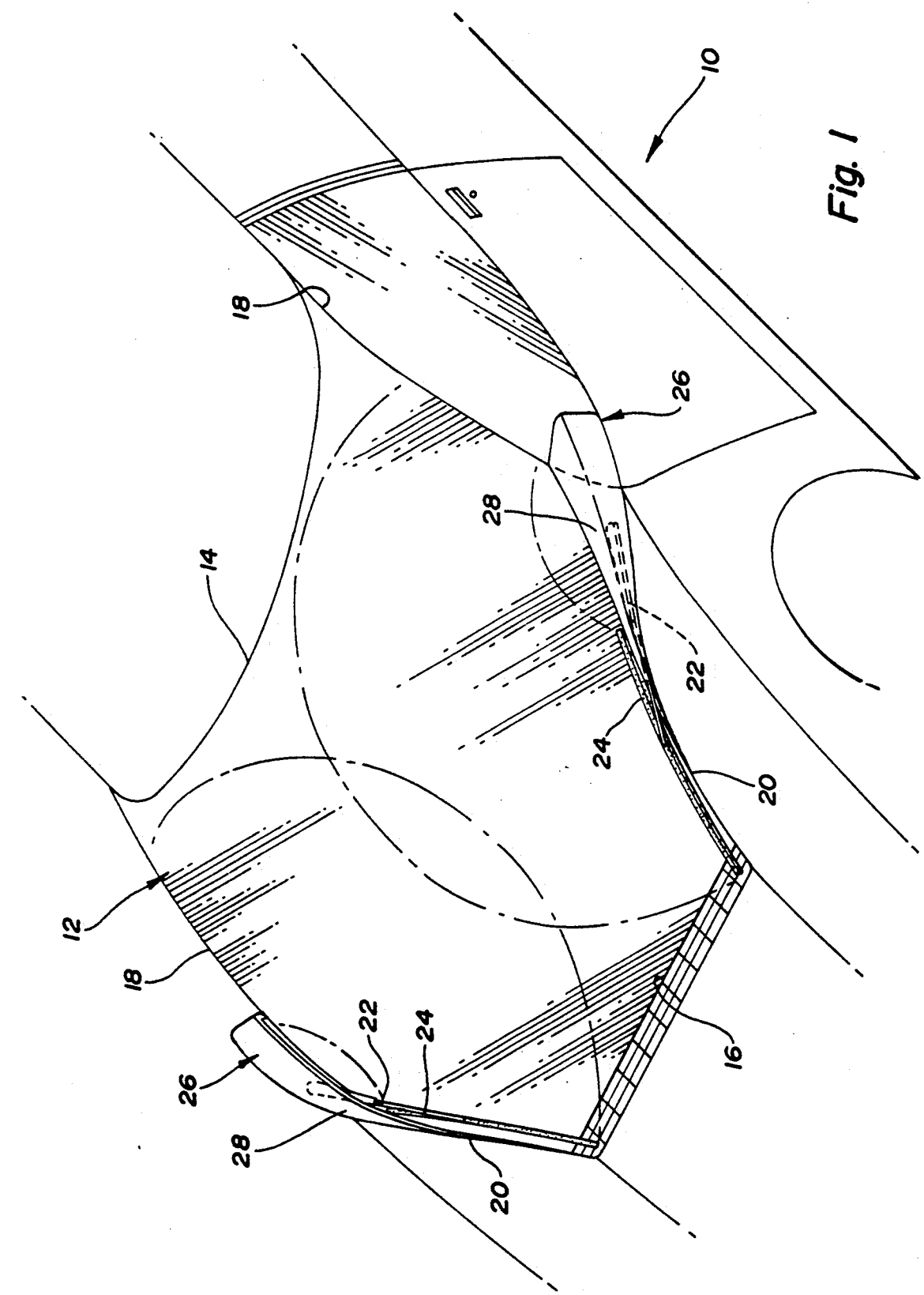
FIG. 1 is a perspective view of the front of a vehicle and windshield illustrating the wipe pattern of the invention.

Referring first to FIG. 1, a vehicle body, indicated generally at 10, is the type that is deliberately designed to have a very low coefficient of drag. One of the main ways this is achieved is by steely "raking" the windshield, indicated generally at 12. Windshield 12 is swept back, greatly increasing its length. Just as with a conventional windshield, windshield 12 has an upper edge along the roof line 14, and a lower edge along the cowl line 16. The roof line 14 and cowl line 16 are basically straight and parallel, albeit slightly curved, but much farther apart than is conventional. Windshield 12 has side edges, of course, which are inevitably as long as the windshield 12 itself. In the particular embodiment disclosed, the windshield side edges are not perfectly straight. Instead, they form a shallow, generally symmetrical V, including an upper branch formed along a body door pillar line 18 and a lower branch formed along a hood line 20. As such, windshield 12 has a slightly hexagonal shape, although it can be considered a rectangle, as is next described.

Figure 2:
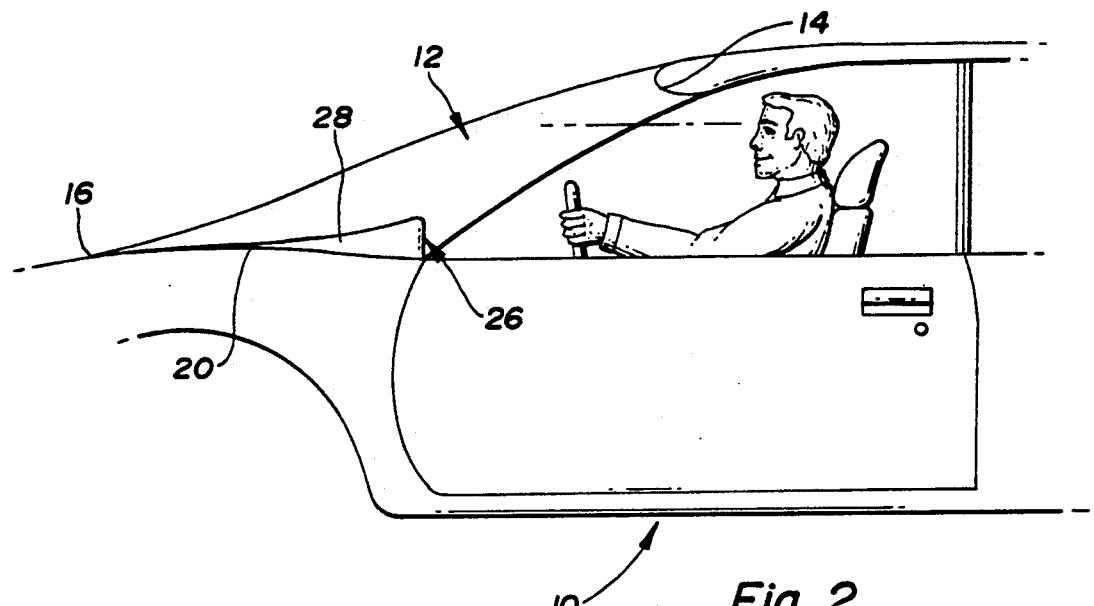
FIG. 2 is a side view of a the vehicle and a driver, illustrating the driver's line of sight.

Referring next to FIGS. 2 through 3b, it may be seen that windshield 12 presents only a normal sized effective vertical sight area to a driver, because it is so steeply raked. But because windshield 12 is so long, a great deal of actual surface area has to be wiped just to clear the legal area. FIGS. 3a and 3b show windshield 12 as a long rectangle, which it basically is. The inadequacy of conventionally sited wipers is illustrated. One conventional alternative, shown in 3a, is a single wiper, located with its pivot point in the exact center of the lower edge of windshield 12, marked by a small X. If a wiper has a fixed length, its maximum practical length is half the width of the lower edge. The wipe pattern it would produce is shown by the dotted half circle. Clearly, it is totally inadequate to the task. There are non fixed length, extending and retracting wipers available, but they are complex, expensive, and even they would not extend far enough to do the job. Another conventional arrangement is two fixed length wipers, located with their pivot points on the same lower edge, shown in FIG. 3b. The farthest apart that they could be spaced would be out to the very corners of the windshield 12, and the longest fixed length they could have would be the same as the width of windshield 12. If that were done, which would be very impractical, the best that they could theoretically produce would be the two quarter circle wipe patterns shown in dotted lines. That still would not wipe enough of the surface area of windshield 12.

Referring next to FIGS. 1 and 3c, the wipe pattern produced by the invention is illustrated. Two fixed length wiper arms 22 are driven about pivot points located about halfway along the side edges of windshield 12. Specifically, the pivot points for wiper arms 22 are located near the juncture of door pillar edge 18 and hood line edge 20, at the base of the V. Wiper arms 22 would be driven by any suitable motor and linkage, not separately illustrated. Each arm 22 would be oscillated back and forth far enough to move between an upper limit proximate and parallel to a respective door pillar line 18, and a lower limit proximate and parallel to a hood line 20. Each wiper arm 22 has a conventional wiper blade 24 mounted to it that is long enough to reach near the roof line 14 and near the cowl line 16 at the upper and lower wipe limits respectively. The wipe pattern so produced is shown in dotted lines. Essentially the entire actual surface area of windshield 12 is covered, except for small unwiped areas at the very top and bottom, which do not seriously intrude into the line of sight. The central overlap is not more than conventional drive systems can handle without collision, and double wiping of that central overlap area is desirable. In conclusion, conventional, fixed length wipers, driven by conventional means, but sited in the novel way disclosed, produce a new wipe pattern that adequately wipes a much longer surface area.

Referring again to FIG. 1, an additional feature is made possible by the unique siting of the wiper pivot points. In the embodiment shown, vehicle body 10 also has a pair of aerodynamically shaped side mirror housings, indicated generally at 26. Each mirror housing 26 has an elongated, tapered fairing 28 that extends out partially along the length of a respective hood line 20. Where it hangs over the surface of window 12, each fairing 28 is slotted. Thus, the pivot for each wiper arm 22 can be located under a housing 26, and the wiper arm 22 can move through the slotted fairing 28 without interference. Each wiper arm 22 can be stopped or "parked" at the lower limit of the wipe pattern, along a respective hood line 20. It will be then masked and covered by a respective fairing 28. This is an aesthetic advantage, and an aerodynamic improvement as well, as the fairing 28 is much smoother than the wiper arm 22.

Variations of the embodiment disclosed could be made. If there were no mirror housings 26 available to mask the wiper arms 22, they could, instead, be parked at the upper wipe limit. If parked along the door pillar edges 18, which are themselves swept back, the wiper arms 22 would present much less area to the wind flow than do conventionally parked wipers. A windshield that had basically straight side edges, rather than the shallow V-shape shown, could still be wiped with wipers located in the same arrangement. Therefore, it will be understood that it is not intended to limit the invention to just the embodiment disclosed.

The embodiments of the invention in which an exclusive property or privilege is claimed are defined as follows:

1. A wiper system in a vehicle of the type having a windshield with a lower edge, an upper edge, and a pair of side edges, each of which side edges is defined partially by a body door pillar line and partially by a hood line, said windshield also having a length measured from said lower to upper edge that is relatively large compared to its width measured between said side edges, a wiper system, comprising, a pair of wiper arms, each oscillatable about a respective pivot point located at the juncture of a respective door pillar line and hood line and over a wipe pattern having an upper limit parallel to a respective door pillar line and a lower limit parallel to a respective hood line, a wiper blade mounted to each of said arms of a length sufficient to reach close to both said upper and lower edges as said wiper arms move in said wipe pattern, and, a pair of slotted side mirror housings, each located over a wiper arm pivot point and extending partially along a respective hood line, whereby, as said wiper arms oscillate, they move through said slotted wiper housings as substantially the entire surface of said windshield is wiped by said blades, and when said wiper arms are stopped at said lower limit, they are partially covered by said side mirror housings.

* * * * *